United States Patent
Lin et al.

(10) Patent No.: US 11,824,659 B2
(45) Date of Patent: Nov. 21, 2023

(54) METHOD AND APPARATUS FOR OPTIMIZED HARQ OPERATION

(71) Applicant: Telefonaktiebolaget LM Ericsson (publ), Stockholm (SE)

(72) Inventors: Zhipeng Lin, Nanjing (CN); Robert Mark Harrison, Grapevine, TX (US); Andres Reial, Lomma (SE); Robert Baldemair, Solna (SE); Ali Behravan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/280,176

(22) PCT Filed: Sep. 23, 2019

(86) PCT No.: PCT/CN2019/107285
§ 371 (c)(1),
(2) Date: Mar. 25, 2021

(87) PCT Pub. No.: WO2020/063533
PCT Pub. Date: Apr. 2, 2020

(65) Prior Publication Data
US 2022/0006572 A1    Jan. 6, 2022

(30) Foreign Application Priority Data
Sep. 28, 2018    (WO) ................ PCT/CN2018/108495

(51) Int. Cl.
*H04L 1/1829*    (2023.01)
*H04L 1/1812*    (2023.01)
*H04L 5/00*    (2006.01)

(52) U.S. Cl.
CPC .......... *H04L 1/1819* (2013.01); *H04L 1/1864* (2013.01); *H04L 5/0005* (2013.01)

(58) Field of Classification Search
CPC ... H04L 1/1819; H04L 1/1864; H04L 5/0005; H04L 1/1822; H04L 5/0055
See application file for complete search history.

(56) References Cited

U.S. PATENT DOCUMENTS

| 2012/0163322 A1* | 6/2012 | Larmo | ................ H04L 1/1854 370/329 |
| 2017/0366363 A1 | 12/2017 | Hong et al. | |

(Continued)

FOREIGN PATENT DOCUMENTS

| CN | 101409608 A | 4/2009 |
| CN | 101707802 A | 5/2010 |

(Continued)

OTHER PUBLICATIONS

International Search Report and Written Opinion for Application No. PCT/CN2019/107285, dated Dec. 20, 2019, 9 pages.
3GPP TS 38.212 V15.3.0, "3rd Generation Partnership Project; Technical Specification Group Radio Access Network; NR; Multiplexing and channel coding (Release 15)," Sep. 2018, 99 pages, 3GPP Organizational Partners.

(Continued)

*Primary Examiner* — Ivan O Latorre
*Assistant Examiner* — Malick A Sohrab
(74) *Attorney, Agent, or Firm* — Nicholson De Vos Webster & Elliott LLP

(57) ABSTRACT

A method for optimized hybrid automatic repeat request (HARQ) operation. The method comprises transmitting an uplink data transmission on the shared uplink resource to a network node, and receiving a feedback message from the network node, the feedback message comprising a feedback indication indicating a reception status of the uplink data transmission from the terminal device. An explicit HARQ feedback can be provided for uplink data transmission in a wireless communication network such as a new radio (NR) network.

18 Claims, 9 Drawing Sheets

(56) References Cited

U.S. PATENT DOCUMENTS

| | | | | |
|---|---|---|---|---|
| 2018/0123765 A1* | 5/2018 | Cao | ...................... | H04L 1/1861 |
| 2019/0075573 A1* | 3/2019 | Kwon | ................. | H04W 72/046 |
| 2019/0132824 A1* | 5/2019 | Jeon | .......................... | H04L 5/00 |
| 2019/0230691 A1* | 7/2019 | Cao | ...................... | H04L 5/0044 |
| 2019/0245664 A1* | 8/2019 | Kim | ...................... | H04L 5/0048 |
| 2019/0335480 A1* | 10/2019 | Sun | ....................... | H04W 72/23 |
| 2019/0386783 A1* | 12/2019 | Chou | ................... | H04L 1/1614 |

FOREIGN PATENT DOCUMENTS

| | | | |
|---|---|---|---|
| CN | 104052700 A | | 9/2014 |
| JP | 2012065126 A | * | 3/2012 |
| RU | 2520381 C2 | | 6/2014 |
| WO | 2018/171242 A1 | | 9/2018 |

OTHER PUBLICATIONS

3GPP TS 38.321 V15.3.0, "3rd Generation Partnership Project; Technical Specification Group Radio Access Network; NR; Medium Access Control (MAC) protocol specification (Release 15)," Sep. 2018, 76 pages, 3GPP Organizational Partners.

International Preliminary Report on Patentability, PCT App. No. PCT/CN2019/107285, dated Apr. 8, 2021, 05 pages.

Supplementary European Search Report and Search Opinion, EP App. No. 19865681.1, dated Oct. 20, 2021, 6 pages.

Office Action, CA App. No. 3,114,459, dated May 3, 2022, 5 pages.

Communication pursuant to Article 94(3) EPC, EP App. No. 19865681.1, dated Jun. 13, 2022, 5 pages.

Office Action, CA App. No. 3,114,459, dated Feb. 17, 2023, 4 pages.

* cited by examiner

METHOD AND APPARATUS FOR OPTIMIZED HARQ OPERATION

CROSS-REFERENCE TO RELATED APPLICATIONS

This application is a National stage of International Application No. PCT/CN2019/107285, filed Sep. 23, 2019, which claims priority to International Application No. PCT/CN2018/108495, filed Sep. 28, 2018, which are hereby incorporated by reference.

FIELD OF THE INVENTION

The present disclosure generally relates to communication networks, and more specifically, to optimized hybrid automatic repeat request (HARQ) operation in a wireless communication network.

BACKGROUND

This section introduces aspects that may facilitate a better understanding of the disclosure. Accordingly, the statements of this section are to be read in this light and are not to be understood as admissions about what is in the prior art or what is not in the prior art.

In a wireless communication network such as a new radio (NR)/fifth generation (5G) network, no explicit HARQ feedback is supported for an uplink (UL) data transmission. Also, for an UL data transmission with configured UL grants, only grant-based retransmission is supported. In this case, when a terminal device such as user equipment (UE) transmits an UL data message in a configured grant to a network node such as a base station serving the UE, the UE will not receive an explicit HARQ feedback. If the UE does not receive any Downlink Control Information (DCI) for retransmission within a predetermined time period, the UE may assume that the base station successfully receives the UL data message. Otherwise, the UE may perform a retransmission based on the received DCI. In 3GPP TS38.212, Section 7.3.1.1, a parameter "New Data Indicator (NDI)" in DCI with format 0_0 or 0_1 can be signaled to the UE to indicate an initial transmission or a retransmission of UL data transmission on Physical Uplink Shared Channel (PUSCH).

In the NR network, a HARQ process ID corresponding to an UL data transmission on a preconfigured uplink resource may be determined based on the preconfigured uplink resource that is used for the UL data transmission. In 3GPP TS38.321, Section 5.4.1, the HARQ process ID can be derived from a formula similar to semi-persistent scheduling (SPS) in a LTE network.

For configured UL grants, the HARQ process ID associated with a first symbol of an UL data transmission is derived from the following equation:

HARQ Process ID=[floor(CURRENT_symbol/periodicity)]modulo nrofHARQ-Processes wherein CURRENT_symbol=(System Frame Number (SFN)×numberOfSlotsPerFrame×numberOfSymbolsPerSlot+slot number in the frame×numberOfSymbolsPerSlot+symbol number in the slot), numberOfSlotsPerFrame refers to the number of consecutive slots per frame,
numberOfSymbolsPerSlot refers to the number of consecutive symbols per slot, and nrofHARQ-Processes represents the number of HARQ processes.

In the above equation, CURRENT_symbol refers to a symbol index of a first transmission occasion of a repetition bundle that takes place. Moreover, a HARQ process is configured for a configured UL grant if the configured UL grant is activated and the associated HARQ process ID is less than nrofHARQ-Processes.

In the UL transmission with configured grants, multiple repetitions are supported and a repetition factor is preconfigured. The multiple repetitions of same transport block (TB) share the same HARQ process ID.

Therefore, as described above, in the HARQ operation of the NR network, an implicit HARQ feedback is used for the UL data transmission, and the HARQ process ID is determined mainly based on timings of transmission opportunities configured to the UE for the UL data transmission.

In the NR network, non-orthogonal multiple access (NOMA) schemes are introduced to support a large number of UEs. The NOMA schemes are generally based on interleaving, scrambling, or spreading methods and mapping user data on resources that are shared among multiple UEs. In NOMA, UL transmissions from multiple UEs are overlapping on shared time and frequency resources by using properly designed sequences/vectors in order to spread information symbols in frequency. In a category of NOMA which is based on spreading, this preprocessing is carried out by repeating M-QAM (Quadrature Amplitude Modulation) information symbols over a number of contiguous resource elements (REs), yet each with different weight and phase. The idea behind the NOMA paradigm is that the clever design of spreading vectors can facilitate implementation of advanced multi-user detectors (MUD), such as a minimum-mean squared-error (MMSE) detector or a maximum a posteriori (MAP) detector, in order to improve joint detection/demodulation of superimposed UE transmissions. The NR network supporting NOMA schemes can achieve enhanced performance in terms of sum-rate and/or number of supported UEs, when NOMA-enabled UEs are sharing the time/frequency resources and effective MUD solutions are used to separate their data signals.

Traditionally, data transmissions to or from multiple UEs in a cellular network is preferably done by ensuring, or at least attempting to ensure, orthogonality of the transmitted signals using a conventional orthogonal multiple access (OMA) technology via orthogonal time, frequency, or spatial allocation for the transmitted signals. Additionally, to account for imperfections in such allocation or in the propagation channel, restoring orthogonality is an aim of receiver procedures, which use equalizers, IRC (Interference Rejection Combining)-like receivers and other MMSE-like receivers for e.g. S-OFDM (Spread-Orthogonal Frequency Division Multiplexing) or multiple input multiple output (MIMO) transmission, or non-linear variants of such receivers.

In some scenarios, the network needs to handle a larger number of UEs over given resources than would be allowed according to the OMA technology, e.g. when available degrees of freedom (DoF) are fewer than the number of UEs to be served. According to the NOMA scheme, multiple UEs can be scheduled in same resources, and the UEs' signals will not be substantially orthogonal at a receiver. Rather, there will exist residual inter-user interference that needs to be handled by the receiver. By the nature of NOMA transmission, multiple signals are received non-orthogonally and the overlapping signals must generally be separated by the receiver prior to decoding. To assist in that handling, it is a known technique to impose UE-specific signature sequences (SSs) on the individual UEs' signals. The receiver can then use the SSs to facilitate extracting the individual UEs' signals. Another equivalent view is that invoking the SSs allows the effective end-to-end channel to be made closer to diagonal.

In the NR network supporting NOMA, two or more UEs are scheduled on the same or overlapped time/frequency resources. Thus there may be a higher probability of conflicts and failed UL transmissions. Therefore, the current HARQ operation, i.e. implicit HARQ feedback, may not be sufficiently robust for NOMA.

Thus it is desirable to optimize the HARQ operation in a wireless communication network, particularly in a NR network.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure proposes a solution of optimized HARQ operation in a communication network, so as to provide an explicit HARQ feedback for uplink data transmissions in the case of multiple terminal devices sharing a same or overlapping uplink resource.

According to a first aspect of the present disclosure, there is provided a method performed by a terminal device of a group of terminal devices sharing an uplink resource. The method comprises transmitting an uplink data transmission on the shared uplink resource to a network node, and receiving a feedback message from the network node, the feedback message comprising a feedback indication indicating a reception status of the uplink data transmission from the terminal device.

In accordance with an exemplary embodiment, the feedback message may further comprise a resource indication indicating preconfigured control information to be used by the terminal device for a subsequent uplink data transmission when the reception status indicates a success of receiving the uplink data transmission from the terminal device.

In accordance with an exemplary embodiment, the feedback indication may further indicate a respective reception status of uplink data transmissions transmitted by one or more other terminal devices of the group of terminal devices.

In accordance with an exemplary embodiment, the resource indication may further indicate respective preconfigured control information to be used by the one or more other terminal devices for a subsequent uplink data transmission when the reception status for the respective terminal devices indicates a success of receiving the respective uplink data transmissions from the one or more other terminal devices.

In accordance with an exemplary embodiment, the resource indication may further indicate a release of the preconfigured control information.

In accordance with an exemplary embodiment, each of the group of terminal devices may be configured with one or more specific signatures, and the respective uplink data transmissions from the group of terminal devices may be imposed with one of the one or more specific signatures for the respective terminal devices.

In accordance with an exemplary embodiment, the feedback indication may be associated with the one or more specific signatures used by the respective one of the group of terminal devices.

In accordance with an exemplary embodiment, the method according to the first aspect of the present disclosure may further comprise determining a location of the reception status in the feedback indication based on the imposed signature.

In accordance with an exemplary embodiment, the method according to the first aspect of the present disclosure may further comprise determining, in response to the reception status indicating a failure of receiving the uplink data transmission, an uplink resource in the shared uplink resource for retransmission based on the imposed signature.

In accordance with an exemplary embodiment, the method according to the first aspect of the present disclosure may further comprise determining a hybrid automatic repeat request (HARQ) process identifier (ID) based on the specific signature to be used for the uplink data transmission and a time resource for the uplink data transmission.

In accordance with an exemplary embodiment, the method according to the first aspect of the present disclosure may further comprise transmitting, in response to the feedback message corresponding to an uplink transmission opportunity in which the terminal device did not transmit an uplink data transmission, an indication message to the network node, the indication message indicating that the terminal device did not transmit an uplink data transmission in the uplink transmission opportunity.

In accordance with an exemplary embodiment, the indication message may be one of an uplink data message with a payload, an uplink data message with only demodulation reference signal (DMRS), and an uplink control message.

In accordance with an exemplary embodiment, the method according to the first aspect of the present disclosure may further comprise transmitting, in response to the feedback indication indicating no reception of the uplink data transmission, a notification message indicating that the network node fails to detect the uplink data transmission.

In accordance with an exemplary embodiment, the feedback message may be received in a group downlink control message common to the group of terminal devices, or in a downlink control message specific to the terminal device, or on a Physical Hybrid ARQ Indicator Channel (PHICH).

In accordance with an exemplary embodiment, the group downlink control message may comprise a number of fields for the group of terminal devices, which field carries the reception status and the preconfigured control information for the respective terminal devices.

In accordance with an exemplary embodiment, the method according to the first aspect of the present disclosure may further comprise receiving a configuration message indicating a field of the number of fields for the terminal device.

In accordance with an exemplary embodiment, the method according to the first aspect of the present disclosure may further comprise receiving a configuration message indicating a field offset and an initial value for a pseudo random variable, and determining a field of the number fields for the terminal device based on the field offset, the initial value and a time resource for the uplink data transmission.

In accordance with an exemplary embodiment, the feedback message may be scrambled with a radio network temporary identifier associated with a service type.

In accordance with an exemplary embodiment, the feedback message may further comprise a service type indication.

According to a second aspect of the present disclosure, there is provided a method performed by a network node. The method comprises receiving an uplink data transmission from a terminal device of a group of terminal devices sharing an uplink resource, and transmitting a feedback message to the terminal device, the feedback message comprising a feedback indication indicating a reception status of the uplink data transmission from the terminal device.

In accordance with an exemplary embodiment, the method according to the second aspect of the present disclosure may further comprise arranging the respective reception statuses of the uplink data transmissions from the group of terminal devices in the feedback indication based on the specific signature imposed on the corresponding uplink data transmission.

In accordance with an exemplary embodiment, the method according to the second aspect of the present disclosure may further comprise determining, in response to the reception status indicating a failure of receiving the uplink data transmission, a hybrid automatic repeat request (HARQ) process ID based on the specific signature used for the uplink data transmission and a time resource for the uplink data transmission.

In accordance with an exemplary embodiment, the method according to the second aspect of the present disclosure may further comprise receiving an indication message or a notification message, wherein the indication message indicates that the terminal device did not transmit an uplink data transmission in the uplink transmission opportunity, and wherein the notification message indicates that the network node fails to detect the uplink data transmission; and performing an action based on the indication message or the notification message In accordance with an exemplary embodiment, the feedback message may be transmitted in a group downlink control message common to the group of terminal devices, or in a downlink control message specific to the terminal device, or on a Physical Hybrid ARQ Indicator Channel (PHICH).

In accordance with an exemplary embodiment, the method according to the second aspect of the present disclosure may further comprise transmitting a configuration message indicating a field of the number of fields for the terminal device.

In accordance with an exemplary embodiment, the method according to the second aspect of the present disclosure may further comprise transmitting a configuration message indicating a field offset and an initial value for a pseudo random variable for the terminal device, and determining a field of the number fields for the terminal device based on the field offset, the initial value and a time resource configured for the terminal device.

According to a third aspect of the present disclosure, there is provided a terminal device. The terminal device comprises one or more processors and one or more memories comprising computer program codes. The one or more memories and the computer program codes are configured to, with the one or more processors, cause the terminal device at least to perform any step of the method according to the first aspect of the present disclosure.

According to a fourth aspect of the present disclosure, there is provided a computer-readable medium having computer program codes embodied thereon which, when executed on a computer, cause the computer to perform any step of the method according to the first aspect of the present disclosure.

According to a fifth aspect of the present disclosure, there is provided a base station. The base station comprises one or more processors and one or more memories comprising computer program codes. The one or more memories and the computer program codes are configured to, with the one or more processors, cause the base station at least to perform any step of the method according to the second aspect of the present disclosure.

According to an sixth aspect of the present disclosure, there is provided a computer-readable medium having computer program codes embodied thereon which, when executed on a computer, cause the computer to perform any step of the method according to the second aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
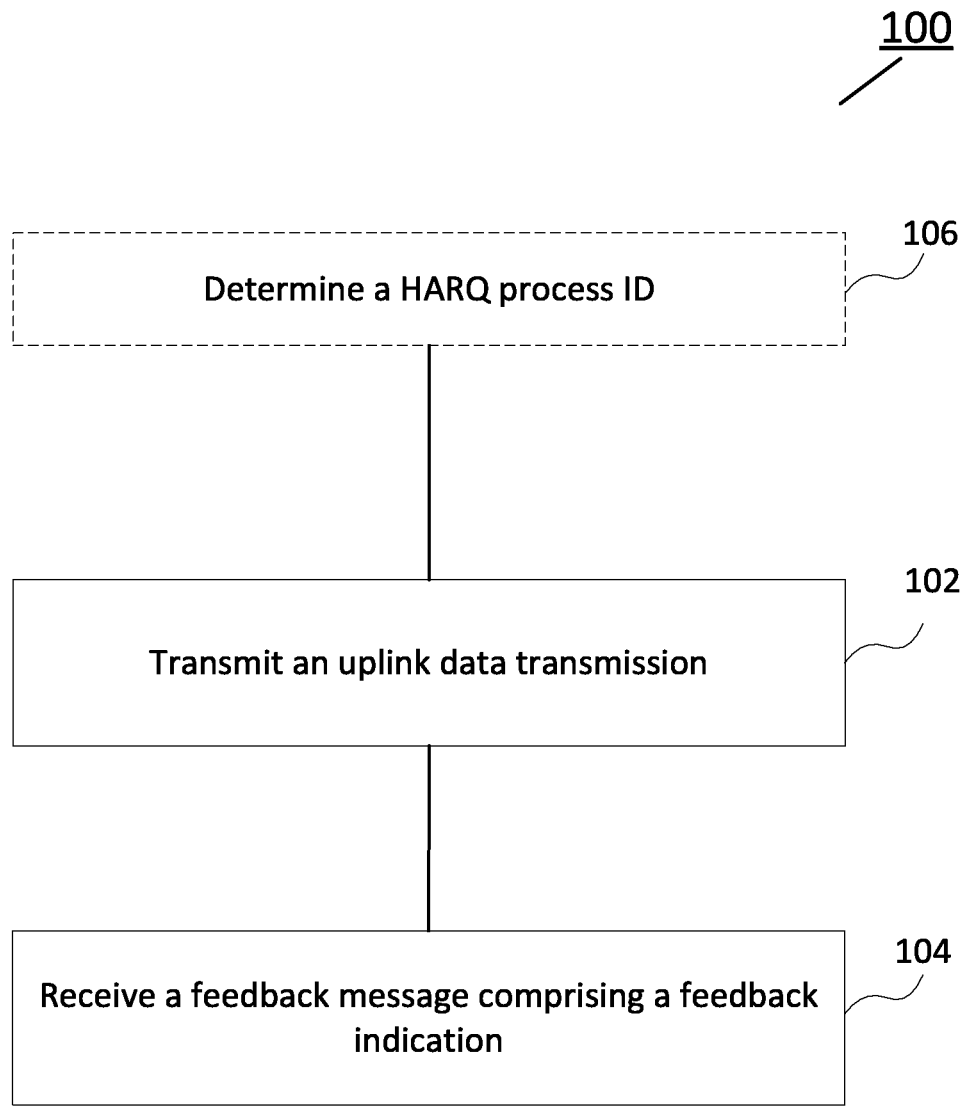
FIG. 1 is a flowchart illustrating a method performed by a terminal device according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, in the NR network, the implicit HARQ feedback is used. But it is not sufficient robust for e.g. NOMA-enabled UEs sharing the same or overlapped uplink resources. Moreover, when the UE operates with configured grant Type 1 or Type 2, the UE transmits data only when there are data to be transmitted. Otherwise the UE does not transmit in the configured grant. But the network node does not know whether or not the UE transmits data, and thus the network node must detect if the UE does not transmit. Therefore, if the network node does not detect any uplink data transmission from the UE, discontinuous transmission (DTX) could be signaled to the UE. But in the current HARQ operation, DTX cannot be signaled to the UE.

In addition, in the NOMA scheme, a signature specific to the UE can be used to differentiate different UEs. Therefore, the HARQ operation may be related to the signature. But in the current HARQ operation, the determination of the HARQ process ID only considers the time resource used for the UL data transmission.

In accordance with some exemplary embodiments, the present disclosure provides a solution to provide the explicit HARQ feedback for UL data transmission in the case of multiple terminal devices sharing the same or overlapped UL resource, e.g. in NOMA scenario, multi-user (MU) MIMO scenario, new radio on unlicensed spectrum (NR-U) scenario, ultra reliable and low latency communication (uRLLC) service, massive machine type communication (mMTC) service, or enhance mobile broadband (eMBB). According to the proposed solution, the terminal device may transmit an UL data transmission on the shared UL resource to a network node. Upon receipt of the UL data transmission, the network node may transmit a feedback message to the terminal device. The feedback message may comprise a feedback indication indicating a reception status of the UL data transmission from the terminal device. Based on the feedback message, the terminal device may perform corresponding operations.

It is noted that some embodiments of the present disclosure are mainly described in relation to NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

FIG. 1 is a flowchart illustrating a method 100 according to some embodiments of the present disclosure. The method 100 illustrated in FIG. 1 may be performed by an apparatus implemented in a terminal device or communicatively coupled to a terminal device. In accordance with an exemplary embodiment, the terminal device may be, for example, a UE. Further the terminal device may be a NOMA-enabled UE, or a UE supporting low latency and high reliability communication, e.g. CMTC or URLLC service, or a UE supporting mMTC service, or a UE operating with MU-MIMO technology.

According to the exemplary method 100 illustrated in FIG. 1, the terminal device may transmit an UL data transmission to a network node such as a serving gNB of the terminal device, as shown in block 102. In some embodiments, the terminal device is one of a group of terminal devices. The group of terminal devices may comprise at least two terminal devices sharing an UL resource. As known, the UL data transmission is transmitted based on UL grants from the network node. The UL grant may be dynamically received from the network node or be preconfigured. When the terminal device has data to be transmitted, it will transmit the data according to the received UL grant or the configured UL grant.

In accordance with an exemplary embodiment, in the case of NOMA, the terminal device may be configured with one or more specific signatures. The specific signature can be imposed on the terminal device's UL data transmission to facilitate the network node extracting the terminal device's UL data transmission.

In 3GPP, several key Transmission (TX) schemes are proposed for NOMA. For each TX scheme, some signature design is also provided for overlapping transmissions over the same resource element(s). As an example, for Welch-bound equality based spread multiple access (WSMA) as a NOMA scheme, the signature may be designed as follows.

Assume a generic vector representation of a multi-user system as $$y = \sum_{k=1}^{K} S_k h_k b_k + z$$

where, y is a received signal, $S_k$ is a diagonal matrix with elements of vector $s_k$ on its main diagonal, and $s_k$ is a spreading sequence for the $k^{th}$ user. Also $h_k$ is a channel for the $k^{th}$ user, and $b_k$ is an information symbol of the $k^{th}$ user. The design metric for signature vectors is the total squared cross-correlation $T_C \triangleq \sum_{i,j} |S_i^H S_j|^2$. The spreading sequences are designed to meet the Welch-bound, $T_C \geq K^2/N$, with equality (WBE), i.e.

$$\sum_{i,j} |s_i^H s_j|^2 = K^2/N$$

where N is the length of the spreading sequence, and K is the total number of the users. The spreading operation is done on modulated symbols. Then the spreading sequence can be used to spread modulated symbols.

In response to transmitting the UL data transmission, the terminal device may receive a feedback message from the network node, as shown in block 104. In some embodiments, the feedback message may comprise a feedback indication which indicates a reception status of the UL data transmission from the terminal device. The reception status may comprise ACK state representing a successful receipt of the UL data transmission, and NACK state representing a failed receipt of the UL data transmission. In this case, the feedback indication may use 1 bit to indicate the reception status. Additionally, the reception status may also comprise a DTX (Discontinuous Transmission) state representing non-reception of the UL data transmission. In this case, the feedback indication may use 2 bits to indicate the reception status.

Additionally, the feedback indication may further indicate a respective reception status of UL data transmissions transmitted by one or more other terminal devices of the group of terminal devices. Thus the feedback indication can indicate the reception statuses of the UL data transmissions transmitted by some or all terminal devices of the group of terminal devices. These UL data transmissions may be transmitted in the same slot or in different slots.

In some exemplary embodiments, the feedback message may further comprise a resource indication. In some embodiments, the resource indication may indicate preconfigured control information to be used by the terminal device for a subsequent uplink data transmission when the reception status indicates the success of receiving the uplink data transmission from the terminal device, i.e. ACK. Therefore, when the reception status is ACK, the resource indication may indicate to the terminal device what preconfigured control information will be used for a new transmission. In an exemplary embodiment, the preconfigured control information may comprise a plurality of pieces of control information, for example, a signature, a modulation and coding scheme (MCS), an UL grant, or any combination thereof. These control information can be indexed. Then the resource indication may use appropriate bits to indicate the index of the control information. For example, 2 or more bits may indicate to the terminal device that it should use one out of 4 or more preconfigured control information for a new transmission.

Additionally, the time duration for how long the preconfigured control information is valid could be part of the preconfigured control information. In some embodiments, the resource indication may further indicate a release of the preconfigured control information. For example, the resource indication may use all zero bits to indicate the release. Thus the preconfigured control information will not be used for the subsequent UL data transmission any more.

Additionally, the resource indication may further indicate respective preconfigured control information to be used by one or more other terminal devices for a subsequent uplink data transmission when the reception status for the respective one or more other terminal devices indicates the success of receiving the respective uplink data transmissions from the one or more other terminal devices, i.e. ACK. Therefore, when the reception status for a terminal device is ACK, the resource indication may indicate to this terminal device what preconfigured control information will be used for a new transmission.

With the resource indication, when the terminal device has more data than average to transmit, it can be dynamically allocated preconfigured control information while using a smaller "grant" compared to a full downlink control information (DCI) used to allocate UL resources for one terminal device.

In some embodiments, the feedback message is a separate message for each of the group of terminal devices. In this case, the feedback message may comprise the feedback indication and resource indication only for one terminal device.

In some embodiments, the feedback message may be used for the group of the terminal devices. In this case, the feedback message may comprise the feedback indication and resource indication for the group of terminal devices. Moreover, if the feedback message is sent to the group of terminal devices, the DTX state can either be acknowledged as NACK state (if 1 bit feedback indication is available) or explicitly acknowledged as DTX state (if 2 bits feedback indication is available).

In some exemplary embodiments, each of the group of terminal devices may be configured with one or more specific signatures. The specific signature is specific to a terminal device. One uplink data transmission from one of the group of terminal devices can be imposed with one specific signature of the terminal device. Therefore, the feedback indication can be associated with the specific signatures of the group of terminal devices.

For example, assume a group of 4 UEs are allocated on overlapping time-frequency resources, the number of HARQ process is one, each UE has two signatures to be used, and only latest previous UL data transmission is considered. Then the UL data transmissions of the 4 UEs with each signature can be represented as {sg0, UE0}, {sg1, UE0}, {sg2, UE1}, {sg3, UE1}, {sg4, UE2}, {sg5, UE2}, {sg6, UE3}, {sg7, UE3}, where {sgi, UEj} means the UL data transmission of UEj with signature sgi.

In this example, the feedback indication can use 8 bits to indicate ACK/NACK state: A0A1A2A3A4A5A6A7. Bit Ai=0 means the reception status for the latest UL data transmission of UEj with signature sgi is NACK, and bit Ai=1 means the reception status for the latest UL data transmission of UEj with signature sgi is ACK, where j=floor(i/2).

Moreover, in the above example, more dimensions e.g. time dimension, can also be introduced in the feedback indication when a multiple of the previous transmissions are considered for each UE with the same signature.

Alternatively or additionally, the feedback indication may be associated with the UL time-frequency resources scheduled for the group of terminal devices, and/or a NOMA-radio network temporary identifier (RNTI) with its own control resource set (CORESET).

In some embodiments, as the feedback indication is associated with the specific signatures of the group of terminal devices, the terminal device may determine a location of the reception status for its UL data transmission in the feedback indication based on the imposed specific signature, after receiving the feedback message. In the above example, UE2 may determine the location of the reception status for the UL data transmission {sg5, UE2} as A5.

In some embodiments, the feedback indication may be mapped to uplink resources for retransmission, and then the terminal device may determine, in response to the reception status indicating the NACK state for the UL data transmission, an UL resource for retransmission based on the imposed specific signature.

In the above example, if UEj receives NACK for its UL data transmission with signature sgi, UEj can derive the UL resource for retransmission based on the signature sgi from the table as below. Moreover, in the table, other dimensions, e.g. the time-frequency resources can also be considered.

| Previous transmission | {sg0, UE0} | {sg1, UE0} | {sg2, UE1} | {sg3, UE1} | {sg4, UE2} | {sg5, UE2} | {sg6, UE3} | {sg7, UE3} |
|---|---|---|---|---|---|---|---|---|
| Bit value | 0xxxxxxx | x0xxxxxx | xx0xxxxx | xxx0xxxx | xxxx0xxx | xxxxx0xx | xxxxxx0x | xxxxxxx0 |
| Retransmission | {sg1, UE0} | {sg0, UE0} | {sg3, UE1} | {sg2, UE1} | {sg5, UE2} | {sg4, UE2} | {sg7, UE3} | {sg6, UE3} |

A person skilled in the art will appreciate that the determination of the UL resource for retransmission may be also based on a dynamic UL grant or a configured UL grant.

Additionally, according to the exemplary method 100 illustrated in FIG. 1, the terminal device may determine a HARQ process ID based on the specific signature to be used for the uplink data transmission and a time resource for the uplink data transmission, as shown in block 106. Generally, the terminal device transmits the UL data transmission with the HARQ process ID. In the case of NOMA, the HARQ process ID is associated with the specific signature in addition to the time resource.

For example, assuming that a UE has two signatures to be used, and a time period comprises 2 time slots, wherein each time slot can be e.g. one uplink slot. Then 4 HARQ process IDs can be determined for the UE as is shown in the table below, where the HARQ process ID is in {0, 1, 2, 3}, Signature ID is in {0, 1}, Time index is in {0, 1}. Therefore, if the UE uses signature 1, and the uplink slot is 0, then the HARQ process ID can be determined as 1.

| HARQ process ID | 0 | 1 | 2 | 3 |
|---|---|---|---|---|
| Signature ID | 0 | 1 | 0 | 1 |
| Time index | 0 | 0 | 1 | 1 |

Similarly, the specific signature can be determined depending on the time instant (e.g. signature hopping over time) and the HARQ process ID.

In some exemplary embodiments, the feedback message may be received in a group downlink control message common to the group of terminal devices, or in a downlink control message specific to the terminal device, or on a Physical Hybrid ARQ Indicator Channel (PHICH).

In some embodiments, the group downlink control message may be group downlink control information (DCI). The group DCI may comprise a number ($N_f$) of fields for the group of terminal devices that are configured to be able to transmit UL data transmission at a given time instant (i.e. one or more symbols in a slot, according to a configured timing offset and periodicity). Each field may be used for one terminal device at one time. The field may carry the reception status and the preconfigured control information (e.g. in the form of index) for the terminal device.

In an exemplary embodiment, if the number of fields $N_f$ is not less than the number of terminal devices of the group, each terminal device may be allocated with a field. Then the terminal device may receive a configuration message indicating the field for the terminal device. The configuration message may be RRC signaling or medium access control (MAC) control elements.

In another exemplary embodiment, if the number of fields $N_f$ is less than the number of terminal devices of the group, considering that the terminal devices will not always transmit and thus can share the fields of the group DCI. Then the field $F_i(s)$ for the terminal device i can be determined as:

$$F_i(s)=(\Delta F_i+X+s) \bmod N_f$$

where $\Delta F_i$ refers to a fixed field offset signalled to the terminal device i in RRC signalling, X represents a pseudo random variable (which is a uniformly distributed integer in a range e.g. [0, $N_f$]) with an initial value (which is fixed or signalled to the terminal device i), and s is a time index such as a slot index, the CURRENT_symbol described above, or another integer value identifying the time to which the DCI corresponds. Therefore, the terminal device may receive a configuration message indicating a field offset $\Delta F_i$ and an initial value for a pseudo random variable X, and determine the field in the group DCI according to the above equation.

In some embodiments, the downlink control message specific to the terminal device may be a UE specific DCI. In this case, the UE specific DCI may include the feedback indication in addition to the NDI.

Additionally in some exemplary embodiments, the feedback message may be scrambled with RNTI associated with a service type. For example, the RNTI may be NOMA-RNTI or NOMA-uRLLC-RNTI or NOMA-mMTC-RNTI or NOMA-eMBB-RNTI. Also the terminal device may have multiple RNTIs. Thus the terminal device may monitor the DCIs with cyclic redundancy check (CRC) scrambled by multiple RNTIs.

Alternatively in some exemplary embodiments, the feedback message may comprise a service type indication to indicate the service type such as mMTC service, uRLLC service, eMBB service, etc.

In accordance with an exemplary embodiment, in the case when the terminal device receives an un-expected feedback message, the terminal device may notify the network node of such wrong feedback. It will be appreciated that the feedback message shall be a separate message for the terminal device. In an exemplary embodiment, upon receipt of the feedback message, the terminal device finds that it corresponds to an UL transmission opportunity in which no UL transmission is transmitted. The terminal device may transmit an indication message to the network node to indicate that no UL transmission is transmitted in that UL transmission opportunity. Additionally, the terminal device may adjust or add some transmission to improve reliability of the subsequent UL data transmissions.

In an exemplary embodiment, the indication message may be a UL data message on physical uplink shared channel (PUSCH) with predefined information bit payload that indicates the wrong feedback. Alternatively, the indication message may be a UL data message with only demodulation reference signal (DMRS), and thus no uplink shared channel (UL_SCH) is present and no power is used to transmit the resource elements corresponding to the UL_SCH. Alternatively the indication message may be a UL control message on physical uplink control channel (PUCCH) with a bit indicating that the terminal device did not transmit in the UL transmission opportunity corresponding to the feedback message.

Alternatively or additionally, in some exemplary embodiments, if the terminal device transmits the UL data transmission but receives the feedback indication indicating the DTX state, it means that the network node fails to detect/receive the UL data transmission. Then the terminal device may transmit a notification message to the network node to indicate that the network node fails to detect/receive the uplink data transmission.

Figure 2:
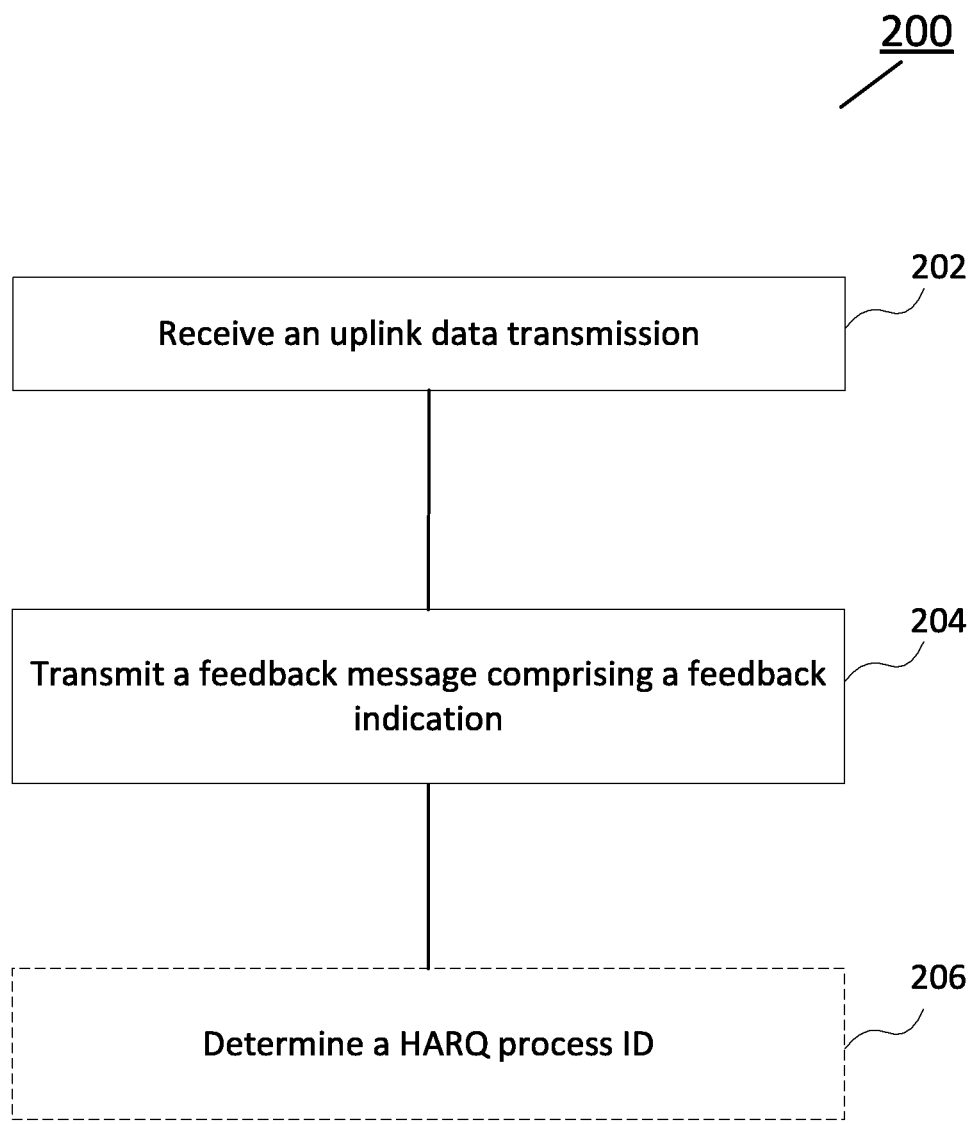
FIG. 2 is a flowchart illustrating a method performed by a network node according to some embodiment of the present disclosure.

FIG. 2 is a flowchart illustrating a method 200 according to some embodiments of the present disclosure. The method 200 illustrated in FIG. 2 may be performed by an apparatus implemented in a network node or communicatively coupled to a network node. In accordance with an exemplary embodiment, the network node such as a gNB may be configured to serve a terminal device as described with respect to FIG. 1. In the following description with respect to FIG. 2, for the same or similar parts as those in the previous exemplary embodiments, the detailed description will be properly omitted.

According to the exemplary method 200 illustrated in FIG. 2, the network node receives an UL data transmission from the terminal device, as shown in block 202. Then the network node transmits a feedback message to the terminal device, as shown in block 204. The details of the feedback message have been described above, and will be omitted herein.

When the network node receives the UL data transmission successfully, the network node will set the reception status as ACK state. In this case, the network node can further set the resource indication in the feedback message to indicate the preconfigured control information for a new UL data transmission. When the network node does not receive the UL data transmission successfully, the reception status will be set as NACK state. When the network node does not detect/receive the UL data transmission, the reception status will be set as DTX state.

In some exemplary embodiment, the network node can serve a group of terminal devices sharing the same or overlapping UL resources. Upon receipt of the UL transmission(s) from one or more of the group of terminal devices, the network node may use the feedback indication to indicate the reception status of the respective UL data transmission(s). In the case of NOMA, the UL data transmission may be imposed with the specific signature of the terminal device. Then the feedback indication can be associated with the specific signatures. In this case, the network node may arrange the respective reception statuses of the uplink data transmissions from the group of terminal devices in the feedback indication based on the specific signature imposed on the corresponding uplink data transmission.

Additionally, when the network node does not receive the UL data transmission successfully, the network node may determine a HARQ process identifier of this UL data transmission, as illustrated in block 206. As described above, the determination of the HARQ process identifier is based on the specific signature used for the uplink data transmission and the time resource for the uplink data transmission.

Additionally, after transmitting the feedback message, the network node may receive an indication message from the terminal device. The indication message indicates that the terminal device did not transmit in the UL transmission opportunity corresponding to the feedback message. Then the network node may perform an action to adjust scheduling of subsequent UL data transmission/retransmission for this terminal device. For example, the network node can switch the terminal device from NOMA to OMA, or use dynamic scheduling with different UL resource for the terminal device.

Alternatively or additionally, after transmitting the feedback message with the feedback indication indicating the DTX state, the network node may receive a notification message from the terminal device. The notification message indicates that the network node fails to detect/receive the UL data transmission corresponding to the feedback message. Then the network node may perform the action as above.

In accordance with an exemplary embodiment, the feedback message may be transmitted in the group DCI as described above. The network node may transmit a configuration message to the terminal device to indicate which field of the group DCI to be used for the terminal device. The details of the configuration message have been described above and hence will be omitted here.

In some exemplary embodiments, the network node may use the RNTI associated with a service type to scramble the feedback message.

The proposed solutions for optimized HARQ operation in accordance with the previous exemplary embodiments can provide an explicit HARQ feedback for the uplink data transmission in the case of multiple terminal devices sharing an uplink resource, thereby improving the robustness of the HARQ operation. Moreover in the case of NOMA, the determination of the HARQ process ID can take the specific signature of the terminal device and the time resource for the UL data transmission into account, which can achieve more flexible scheduling and improve transmission efficiency. The method as shown in FIG. 1 or FIG. 2 can be applicable to NOMA, NR-U, uRLLC service, mMTC service, eMBB service, etc.

The various blocks shown in FIGS. 1-2 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 3:
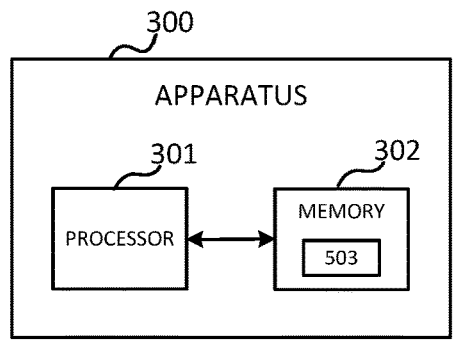
FIG. 3 is a block diagram illustrating an apparatus according to some embodiments of the present disclosure.

FIG. 3 is a block diagram illustrating an apparatus 300 according to various embodiments of the present disclosure. As shown in FIG. 3, the apparatus 300 may comprise one or more processors such as processor 301 and one or more memories such as memory 302 storing computer program codes 303. The memory 302 may be non-transitory machine/processor/computer readable storage medium. In accordance with some exemplary embodiments, the apparatus 300 may be implemented as an integrated circuit chip or module that can be plugged or installed into a terminal device as described with respect to FIG. 1, or a network node as described with respect to FIG. 2.

In some implementations, the one or more memories 302 and the computer program codes 303 may be configured to, with the one or more processors 301, cause the apparatus 300 at least to perform any operation of the method as described in connection with FIG. 1. In such embodiments, the apparatus 300 may be implemented as at least part of or communicatively coupled to the terminal device as described above. As a particular example, the apparatus 300 may be implemented as a terminal device.

In other implementations, the one or more memories 302 and the computer program codes 303 may be configured to, with the one or more processors 301, cause the apparatus 300 at least to perform any operation of the method as described in connection with FIG. 2. In such embodiments, the apparatus 300 may be implemented as at least part of or communicatively coupled to the network node as described above. As a particular example, the apparatus 300 may be implemented as a base station.

Alternatively or additionally, the one or more memories 302 and the computer program codes 303 may be configured to, with the one or more processors 301, cause the apparatus 300 at least to perform more or less operations to implement the proposed methods according to the exemplary embodiments of the present disclosure.

Figure 4:
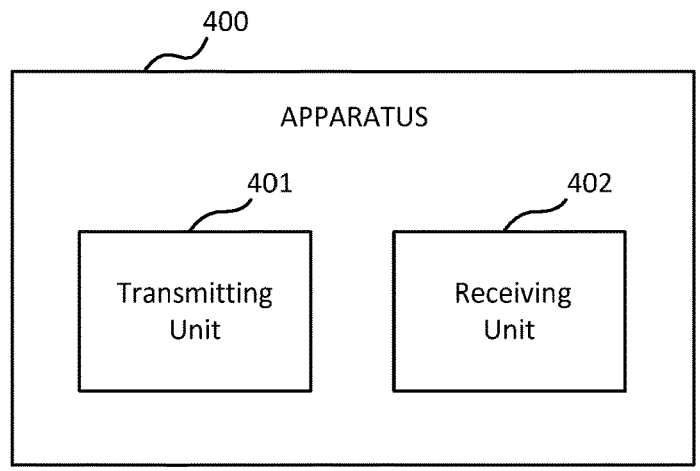
FIG. 4 is a block diagram illustrating an apparatus according to some embodiments of the present disclosure.

FIG. 4 is a block diagram illustrating an apparatus 400 according to some embodiments of the present disclosure. As shown in FIG. 4, the apparatus 400 may comprise a transmitting unit 401 and a receiving unit 402. In an exemplary embodiment, the apparatus 400 may be implemented in a terminal device such as a UE. The transmitting unit 401 may be operable to carry out the operation in block 102, and the receiving unit 402 may be operable to carry out the operation in block 104. Optionally, the transmitting unit 401 and/or the receiving unit 402 may be operable to carry out more or less operations to implement the proposed methods according to the exemplary embodiments of the present disclosure.

Figure 5:
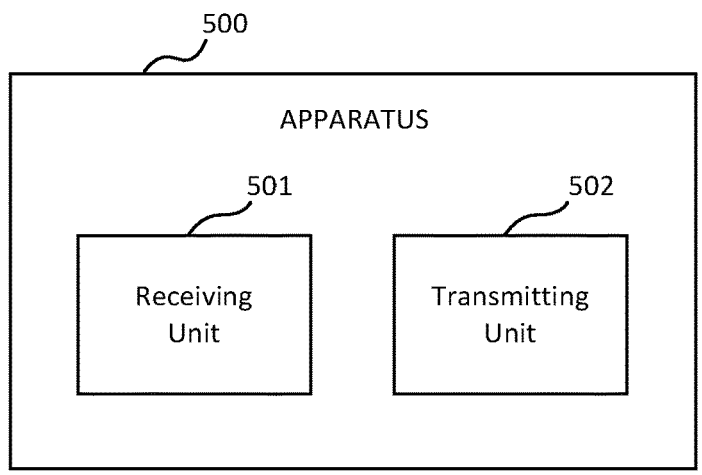
FIG. 5 is a block diagram illustrating an apparatus according to some embodiments of the present disclosure.

FIG. 5 is a block diagram illustrating an apparatus 500 according to some embodiments of the present disclosure. As shown in FIG. 5, the apparatus 500 may comprise a receiving unit 501 and a transmitting unit 502. In an exemplary embodiment, the apparatus 500 may be implemented in a network node such as a gNB. The receiving unit 501 may be operable to carry out the operation in block 202, and the transmitting unit 502 may be operable to carry out the operation in block 204. Optionally, the receiving unit 501 and/or the transmitting unit 502 may be operable to carry out more or less operations to implement the proposed methods according to the exemplary embodiments of the present disclosure.

Figure 6:
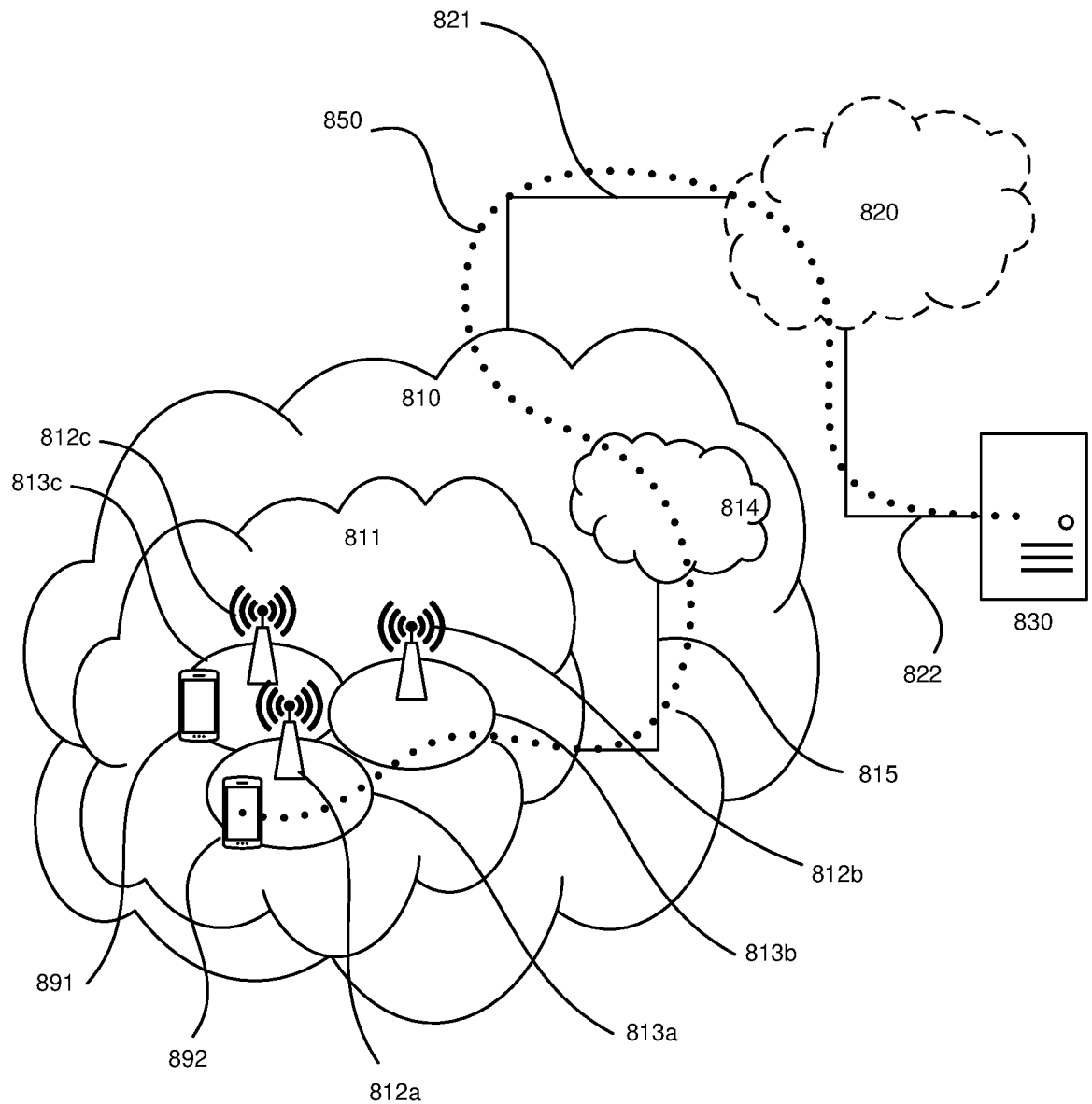
FIG. 6 is a block diagram illustrating a telecommunication network connected via an intermediate network to a host computer in accordance with some embodiments of the present disclosure.

FIG. 6 is a block diagram illustrating a telecommunication network connected via an intermediate network to a host computer in accordance with some embodiments of the present disclosure.

With reference to FIG. 6, in accordance with an embodiment, a communication system includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first UE 891 located in a coverage area 813c is configured to wirelessly connect to, or be paged by, the corresponding base station 812c. A second UE 892 in a coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

Figure 8:
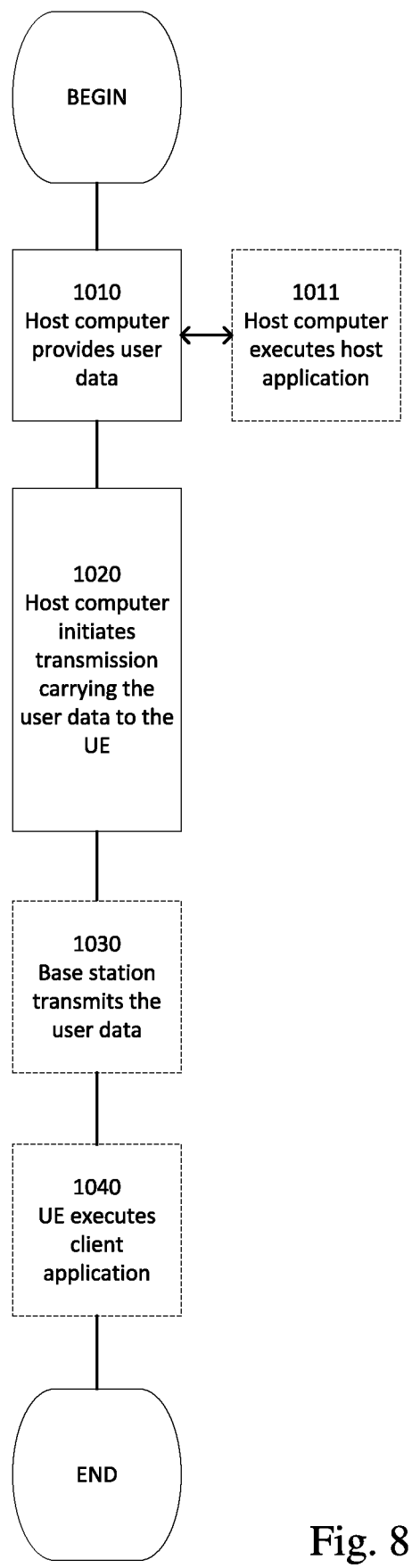
FIG. 8 is a flowchart illustrating a method implemented in a communication system, in accordance with an embodiment of the present disclosure.

The communication system of FIG. 8 as a whole enables connectivity between the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Figure 7:
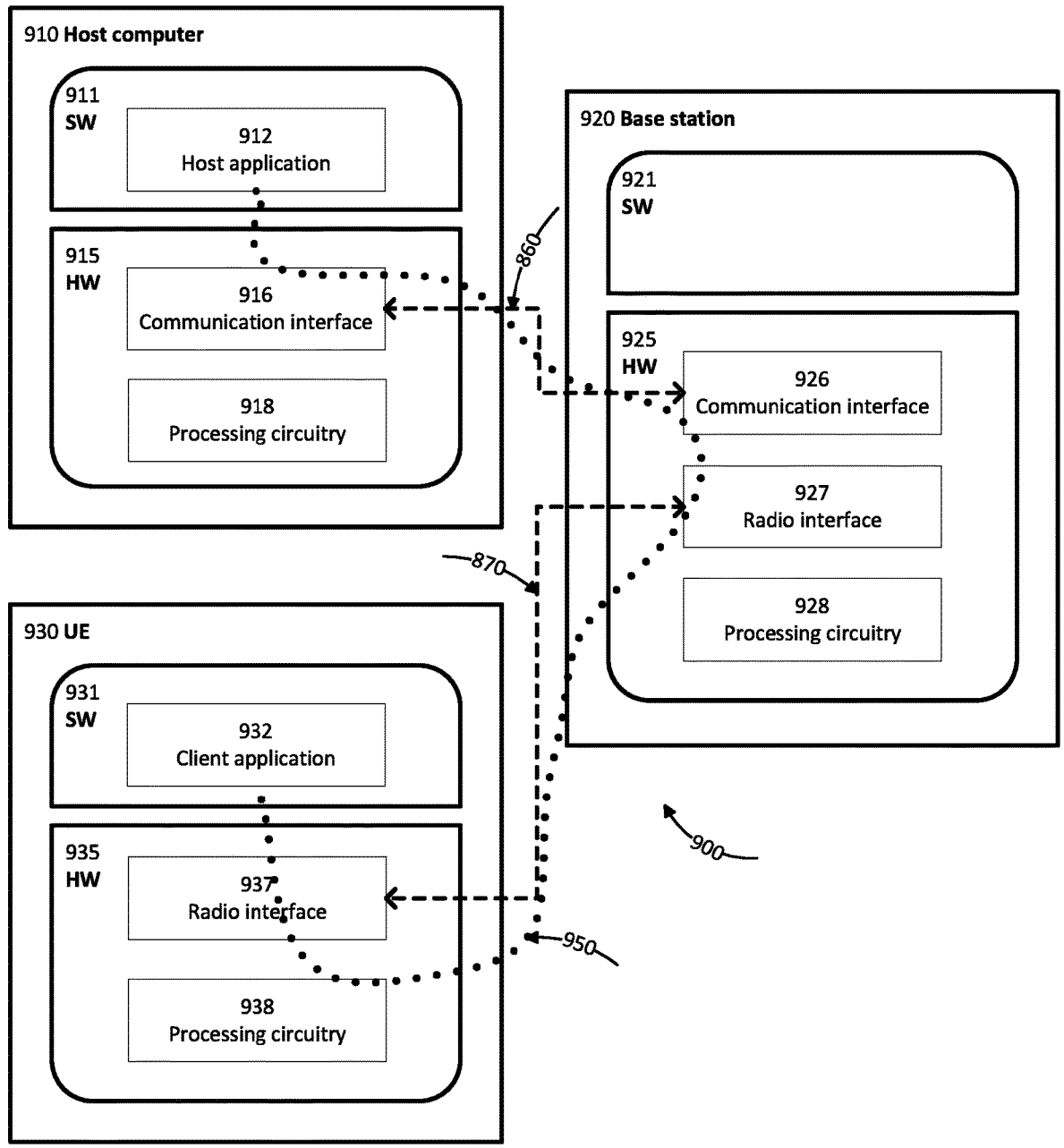
FIG. 7 is a block diagram illustrating a host computer communicating via a base station with a UE over a partially wireless connection in accordance with some embodiments of the present disclosure.

FIG. 7 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 7. In a communication system 900, a host computer 910 comprises hardware 915 including a communication interface 916 configured to set up and maintain a wired or wireless connection with an interface of a different communication device of the communication system 900. The host computer 910 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 9) served by the base station 920. The communication interface 926 may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 820 further has software 921 stored internally or accessible via an external connection.

The communication system 900 further includes the UE 930 already referred to. Its hardware 935 may include a radio interface 837 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

Figure 9:
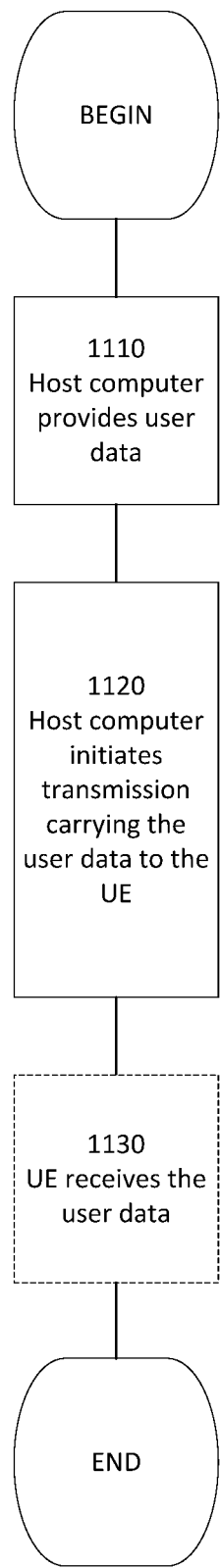
FIG. 9 is a flowchart illustrating a method implemented in a communication system, in accordance with an embodiment of the present disclosure.

It is noted that the host computer 910, the base station 920 and the UE 930 illustrated in FIG. 9 may be similar or identical to the host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 7, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in software 911 and hardware 915 of the host computer 910 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 910's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

FIG. 8 is a flowchart illustrating a method implemented in a communication system, in accordance with an embodiment. The communication system includes a host computer, a base station and a UE which may be those described with reference to FIG. 6 and FIG. 7. For simplicity of the present disclosure, only drawing references to FIG. 8 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

FIG. 9 is a flowchart illustrating a method implemented in a communication system, in accordance with an embodiment. The communication system includes a host computer, a base station and a UE which may be those described with reference to FIG. 6 and FIG. 7. For simplicity of the present disclosure, only drawing references to FIG. 9 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 10:
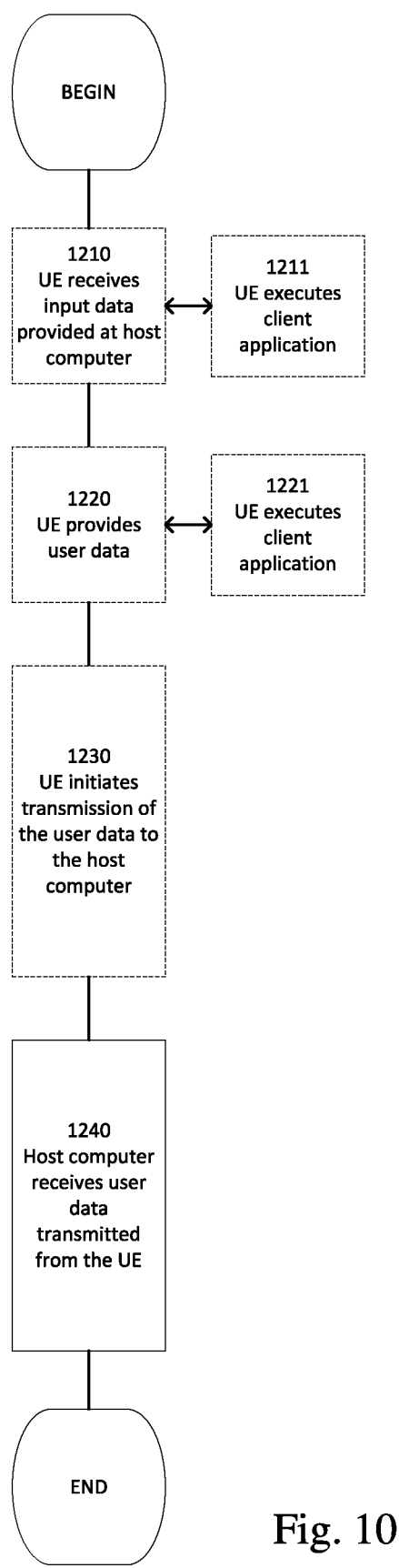
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 6 and FIG. 7. For simplicity of the present disclosure, only drawing references to FIG. 10 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 11:
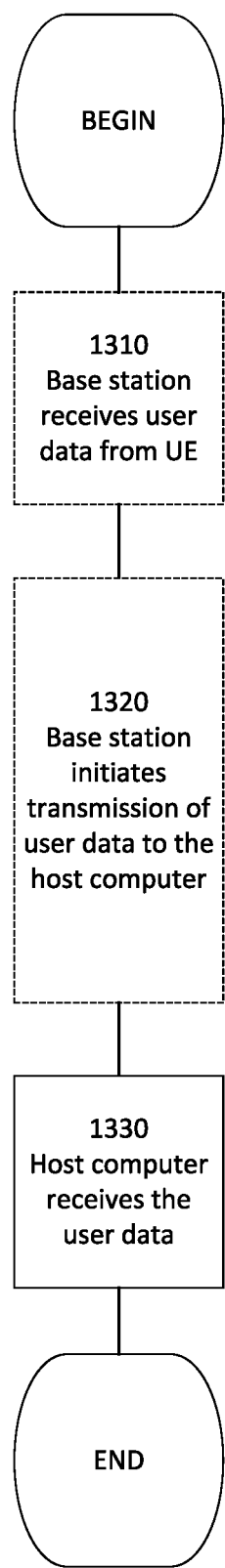
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 6 and FIG. 7. For simplicity of the present disclosure, only drawing references to FIG. 11 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device of a group of terminal devices operating by use of non-orthogonal multiple access (NOMA), wherein the group of terminal devices share same or overlapped uplink resource as a shared uplink resource, the method comprising:
    transmitting an uplink data transmission on the shared uplink resource to a network node using a plurality of different terminal device specific signatures to differentiate the terminal device from other terminal devices using the shared uplink resource, wherein the uplink data transmission uses a terminal device specific signature of the plurality of different terminal device specific signatures to differentiate the uplink data transmission from uplink data transmissions of the other terminal devices and differentiate other uplink transmissions of the terminal device using other of the plurality of different terminal device specific signatures of the terminal device; and
    receiving a feedback message from the network node, the feedback message comprising a feedback indication including a set of bits, each bit of the set of bits indicating a respective reception status of the uplink data transmission from the terminal device and from the other terminal devices, in which the feedback indication for the terminal device is differentiated from feedback indications for the other terminal devices by the terminal device specific signature and differentiated from feedback indications of the other uplink transmissions of the terminal device that use the other of the plurality of different terminal device specific signatures.

2. The method according to claim 1, wherein the feedback message further comprises a resource indication indicating preconfigured control information to be used by the terminal device for a subsequent uplink data transmission when the reception status indicates a success of receiving the uplink data transmission from the terminal device.

3. The method according to claim 2, wherein the resource indication further indicates respective preconfigured control information to be used by one or more of the other terminal devices for a subsequent uplink data transmission when the reception status for the respective terminal devices indicates a success of receiving the respective uplink data transmissions from the one or more of the other terminal devices.

4. The method according to claim 2, wherein the resource indication further indicates a release of the preconfigured control information.

5. The method according to claim 2, wherein the feedback message is received in a group downlink control message common to the group of terminal devices, in a downlink control message specific to the terminal device, or on a Physical Hybrid ARQ Indicator Channel (PHICH).

6. The method according to claim 5, wherein the group downlink control message comprises a number of fields for the group of terminal devices, which field carries the reception status and the preconfigured control information for the respective terminal devices.

7. The method according to claim 6, further comprising:
    receiving a configuration message indicating a field of the number of fields for the terminal device; or receiving a configuration message indicating a field offset and an initial value for a pseudo random variable; and
    determining a field of the number of fields for the terminal device based on the field offset, the initial value and a time resource for the uplink data transmission.

8. The method according to claim 1, wherein the other terminal devices are configured with one or more specific signatures, and wherein respective uplink data transmissions from the other terminal devices is are imposed with specific signatures for the respective terminal devices.

9. The method according to claim 8, further comprising:
    determining a location of the reception status in the feedback indication based on a specific signature.

10. The method according to claim 1, further comprising:
    determining, in response to the reception status indicating a failure of receiving the uplink data transmission, an uplink resource in the shared uplink resource for retransmission based on a specific signature; or
    determining a hybrid automatic repeat request (HARQ) process identifier based on a specific signature to be used for the uplink data transmission and a time resource for the uplink data transmission.

11. The method according to claim 1, further comprising:
    transmitting, in response to the feedback message corresponding to an uplink transmission opportunity in which the terminal device did not transmit an uplink data transmission, an indication message to the network node, the indication message indicating that the terminal device did not transmit an uplink data transmission in the uplink transmission opportunity, wherein the indication message is one of an uplink data message with a payload, an uplink data message with only demodulation reference signal (DMRS), or an uplink control message; or
    transmitting, in response to the feedback indication indicating no reception of the uplink data transmission, a notification message indicating that the network node fails to detect the uplink data transmission.

12. The method according to claim 1, wherein the feedback message is scrambled with a radio network temporary identifier associated with a service type or wherein the feedback message further comprises a service type indication.

13. A method performed by a network node that communicates with a group of terminal devices by use of non-orthogonal multiple access (NOMA), wherein the group of terminal devices share same or overlapped uplink resources as a shared uplink resource, comprising:
receiving an uplink data transmission on the shared uplink resource from a terminal device of the group of terminal devices, using a plurality of different terminal device specific signatures to differentiate the terminal device from other terminal devices using the shared uplink resource, wherein the uplink data transmission uses a terminal device specific signature of the plurality of different terminal device specific signatures to differentiate the uplink data transmission from uplink data transmissions of the other terminal devices and differentiate other uplink transmissions of the terminal device using other of the plurality of different terminal device specific signatures of the terminal device; and
transmitting a feedback message to the terminal device, the feedback message comprising a feedback indication including a set of bits, each bit of the set of bits indicating a respective reception status of the uplink data transmission from the terminal device and from the other terminal devices, in which the feedback indication for the terminal device is differentiated from feedback indications for the other terminal devices by the terminal device specific signature and differentiated from feedback indications of the other uplink transmissions of the terminal device that use the other of the plurality of different terminal device specific signatures.

14. The method according to claim 13, wherein the feedback message further comprises a resource indication indicating preconfigured control information to be used by the terminal device for a subsequent uplink data transmission when the reception status indicates a success of receiving the uplink data transmission from the terminal device.

15. The method according to claim 14, wherein the resource indication further indicates respective preconfigured control information to be used by one or more of the other terminal devices for a subsequent uplink data transmission when the reception status for the respective terminal devices indicates a success of receiving the respective uplink data transmissions from the one or more of the other terminal devices.

16. The method according to claim 14, wherein the resource indication further indicates a release of the preconfigured control information.

17. The method according to claim 13, wherein the other terminal devices are configured with one or more specific signatures, and wherein respective uplink data transmissions from the other terminal devices is are imposed with specific signatures for the respective terminal devices.

18. A terminal device, comprising:
one or more processors; and
one or more memories comprising computer program codes which, when executed by the one or more processors, cause the terminal device to operate within a group of terminal devices by use of non-orthogonal multiple access (NOMA), wherein the group of terminal devices share same or overlapped uplink resources as a shared uplink resource, wherein the terminal device to:
transmit an uplink data transmission on a shared uplink resource to a network node using a plurality of different terminal device specific signatures to differentiate the terminal device from other terminal devices using the shared uplink resource, wherein the uplink data transmission uses a terminal device specific signature of the plurality of different terminal device specific signatures to differentiate the uplink data transmission from uplink data transmissions of the other terminal devices and differentiate other uplink transmissions of the terminal device using other of the plurality of different terminal device specific signatures of the terminal device; and
receive a feedback message from the network node, the feedback message comprising a feedback indication including a set of bits, each bit of the set of bits indicating a respective reception status of the uplink data transmission from the terminal device and from the other terminal devices, in which the feedback indication for the terminal device is differentiated from feedback indications for the other terminal devices by the terminal device specific signature and differentiated from feedback indications of the other uplink transmissions of the terminal device that use the other of the plurality of different terminal device specific signatures.

* * * * *